United States Patent [19]

Coleman

[11] 4,378,758
[45] Apr. 5, 1983

[54] INCUBATION METHOD AND PROCESS

[75] Inventor: Marilyn A. Coleman, Columbus, Ohio

[73] Assignees: Gerald L. Smith; Jerry K. Mueller, Jr., both of Columbus, Ohio; a part interest

[21] Appl. No.: 53,407

[22] Filed: Jun. 29, 1979

[51] Int. Cl.$^3$ .................. A01K 41/00; A01K 41/02
[52] U.S. Cl. ................................. 119/35; 119/37; 119/43
[58] Field of Search ............... 119/35, 37, 38, 43, 119/44

[56] References Cited

U.S. PATENT DOCUMENTS 798,697 9/1905 Perkins .................................. 119/37
3,958,711 5/1976 Morris et al. ......................... 119/43

OTHER PUBLICATIONS

Lauber, J. K. and J. V. Shutze, "Accelerated Growth of Embryo Chicks Under the Influence of Light" 1964 pp. 179-190.

Primary Examiner—Hugh R. Chamblee
Attorney, Agent, or Firm—Mueller and Smith

[57] ABSTRACT

Process and apparatus for photoaccelerating the development of eggs such as chicken eggs. The eggs are arranged in an incubator such that the air cells thereof are disposed upwardly. During incubation the eggs are exposed to radiation in the visible spectra through the air cell during the period of buoyancy of the embryo. Preferred regions of the spectrum are the blue region, red region and yellow region. The apparatus of the invention provides for the transmission of light by fiber optics to the air cell region of each egg from light sources disposed adjacent egg carrying racks within the incubator.

8 Claims, 13 Drawing Figures

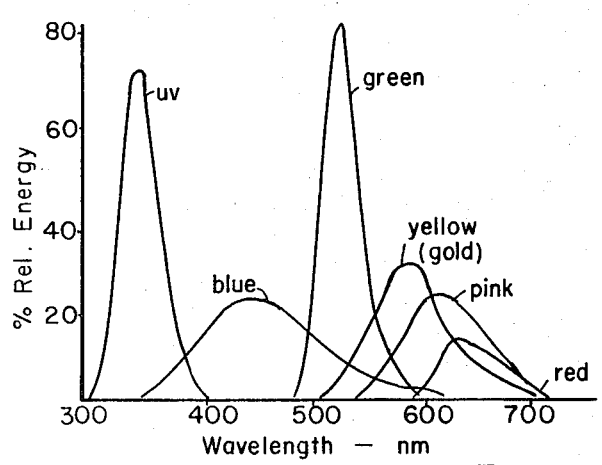
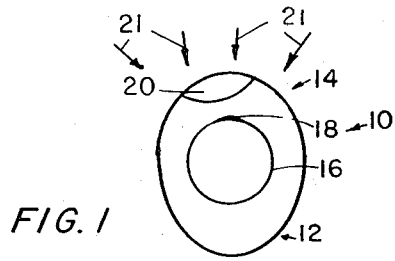
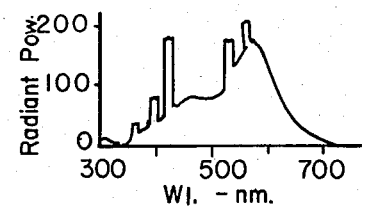
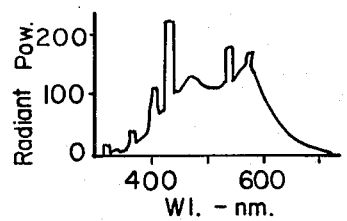
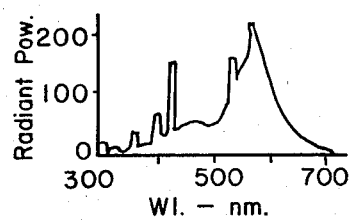
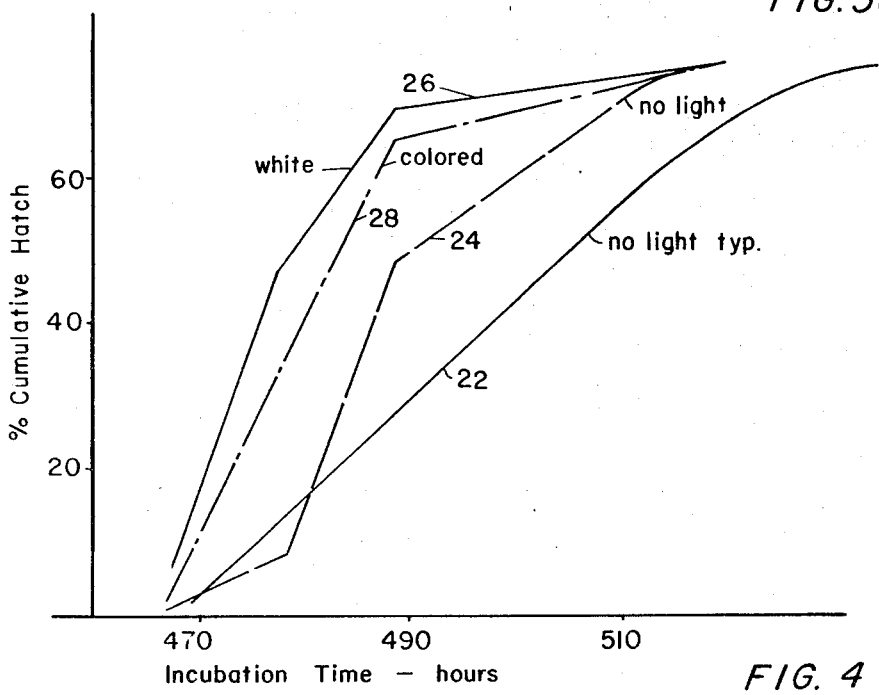

INCUBATION METHOD AND PROCESS

BACKGROUND OF THE INVENTION

The poultry industry carries out the hatching of more than 8.3 million birds each week in the United States. This hatching procedure commences with the collection of eggs from a henhouse environment, the eggs being taken from the nest and positioned in a plurality of trays or flats. These trays may, for example, be placed within wheeled carts which are then delivered to a hatchery. At the hatchery, the carts and trays therewithin are positioned within relatively large incubators and there they remain generally in darkness and under carefully controlled conditions of humidity and temperature, for an interval usually amounting to about 21 days and 6 hours, at which point the operators "pull the hatch." The hatched chicks then are delivered to the "field" where they are fed over about a seven week interval at which point they are ready for market. A hen generally will lay about 100-200 eggs in its seven month economically reproductive lifetime of which only about 90% are deemed "settable" under current practice.

The 10% not considered "settable" are too small or too large for cost effective production. The chicks which are hatched from small eggs (less than 50 grams) are unsatisfactory for large scale bird production, their small size causing them to have a delayed growth pattern which generally is considered uneconomical for high volume production. As a consequence, the eggs of small size usually are sold off rather than hatched, for example, at a very low price level of about 10¢ per dozen. On the other hand, hatchable eggs of adequate size have a value of about $2.50 per dozen at the time of this writing. Eggs from the later part of the reproductive cycle are again unprofitable. These eggs are normally quite large and if they hatch produce an excellent product. But frequently due to egg shell quality and innate embryological changes due to the large sizes, these eggs have a poor hatchability. These older birds cannot produce hatched chicks at a profit.

Beyond the development of incubating devices which have improved controls over temperature and humidity as well as enhanced egg capacities, very few recent advances have been made in the art with respect to the development of high quality chicks which evolve into a quality product at the termination of feed-out. Further, very little has been accomplished in terms of shortening the production cycle of fowl in commercial enterprises. Earlier investigations have determined that turning eggs during incubation prevents the embryo from sticking to the sides of the shell and that hatching time can be accelerated with the addition of heat. Concerning the latter, chicks obtained by increasing incubation temperature over what is considered optimal values are of a poorer quality.

Looking in more detail to earlier investigations, in 1939, Romanoff and Cottrell experimented with opened embryonic eggs and found that there existed an electrical potential difference between the blastoderm and yolk which could be accentuated with further development of the blastoderm. The more developed the blastoderm, the higher the electrical potential difference between blastoderm and yolk. See the following publication in this regard:

I. Romanoff, A. L. and C. L. Cottrell, 1939. Bioelectric potentials of the hen's egg. Science 90: (2342) 471–472

In 1943, Romanoff experimented with different energy sources, X-rays, visible light and ultra-violet radiation. It was found that the above-described electrical potential difference was greater when radiation near UV was striking the embryo. See the following publication in this regard:

II. Romanoff, A. L., 1943. Simulating effects of UV radiation on bioelectric potentials of an avian egg. J. Cell Comp. Physiol. 20: 123–127.

Shutze, experimenting at Washington State University, determined that light would shorten the incubation period of chickens. In this work, eggs were incubated under light for varying amounts of time to study the effect of light upon eye development. However, the investigators reported that none of the monochromatic lights worked as well as white light in speeding up development. But, of monochromatic light the purple region of the spectrum was observed to have produced the most hatching acceleration. See the following publications in this regard:

III. Shutze, J. V., J. K. Lauber, J. Kato and W. Wilson, 1962. Influence of incandescent and coloured light on chick embryos during incubation. Nature (London) 96: 594–595.

IV. Shutze, J. V., 1977. Personal communication.

In 1964, Lauber and Shutze reported that both incandescent and fluorescent light affected the length of incubation. The more time spend under either light, the shorter the incubation time. It was reported that the lights produced seemingly normal hatched chickens. See the following publication in this regard:

V. Lauber, J. K. and J. V. Shutze, 1964. Accelerated growth of embryo chicks under the influence of light. Growth 28: 179–190.

Another review of the effect of light upon incubation procedures was carried out in 1967. In this review, a 100 watt incandescent bulb positioned very close to the eggs being incubated was found to cause gross abnormalities, high mortality and delayed hatching. Further, chicks produced under lighted incubation did poorly in post-hatched growth. See the following publications in this regard:

VI. Tamimie, H. S., 1967. Light exposure of incubating eggs and its influence on the growth of chicks. I. Brooding chicks under different light regimes. Comp. Biochem. Physiol. 21: 59–63.

VII. Tamimie, H. S. and M. W. Fox, 1967. Effect of continuous and intermittent light exposure on embryonic development of chicken eggs. Comp. Biochem. and Physiol. 20: 793–799.

In 1969 and 1970, research was carried out wherein incubating eggs were subjected to a light source present as three, 25-watt incandescent bulbs. This light was directed through a window in the shell of the egg. The investigators found no increase in mortality or abnormality with this procedure, but a decrease in hatching time. The investigators also found that light effects on shortening incubation time were most effective when utilized the first week of incubation. A noticeable acceleration of embryonic development, i.e. differentiation, occurred within 10 hours of incubation by the application of light. This was considered unusual, since it normally requires several hours for eggs to reach incubation temperature and embryonic development does not normally begin until incubation temperature is reached.

It was observed that there was no significant difference in internal egg temperature attributable to the light. The investigators found that the light intensities were important in photoacceleration, with 54–108 luxes producing more somites in ovo after 24 hours. High intensity light (215–430 luxes) resulted in abnormal development both in ovo and in vitro. See the following publications in connection with the above:

IIX. Isakson, S. T., B. J. Huffman and P. B. Siegel, 1970. Intensities of incandescent light and the development of chick embryos in ovo and in vitro. Comp. Biochem. Physiol. 34: 299–305.

IX. Siegel, P. B., S. T. Isakson, F. N. Coleman and B. J. Huffman, 1969. Photoacceleration of development in chick embryos. Comp. Biochem. Physiol. 28: 753–758.

In 1970, Coleman et al. reported upon the effects which light may have on the embryos from normally heavily pigmented eggs such as Japanese quail eggs. The investigation resulted in a separation of the effects on growth and differentiation of light for the first time. Embryos from pigmented and depigmented eggs incubated under lights were both larger than embryos from either type egg incubated in the dark. However, acceleration of embryonic development as well as decreased hatching times occurred only after removal of the spots (depigmentation). Embryos from depigmented Japanese quail eggs hatched $2\frac{1}{2}$ days early. White-shelled eggs developed from quails following demestication hatched much earlier than those quails which were first used experimentally. See the following publication in this regard:

X. Coleman, M. A., A. Dumper, C. Luckner, R. A. McNabb and C. Sellers, 1971. Pigmentation-light screen on camouflage. Va. J. Sci. 22:99.

Cooper observed the photoacceleration of turkey eggs as reported in 1972. Turkey eggs are normally pigmented but the spots are more dispersed than Japanese quail eggs as described above. It was reported that turkeys have increased mortality and abnormalities when incubated under light. Four, 40-watt fluorescent tubes per tray of eggs in a Robbins incubator were utilized. Turkeys which were hatched under light but incubated in the dark had improved hatchability, and the investigator attributed improved hatchability under light to added activity during the hatching period with light available for the poults. See the following publication in this regard:

XI. Cooper, J. B., 1972. Effect of light during incubation on hatchability of turkey eggs. Poultry Sci. 51: 1105–1108.

Walter and Voitle reported on the effect of light during incubation for several types of birds including broiler-type chickens and quail. These investigators used one 40-watt incandescent bulb in an entire Jamesway 252 incubator. Very little effect on growth and development was recorded, but a trend toward earlier hatching for those birds incubated under the lights was noticed. No attempt was made to select uniform sized eggs and as a result standard deviations were somewhat large. The investigators also repoted no difference in post-hatch weight at eight weeks for the chicks. Further reported was an increased navel score (indicating maturity and readiness for placement) for those chicks from lighted incubation. In one experiment the investigators showed additive effects of light. Utilizing a 0–24, 12—12 and 24–0 (hour) photoperiod, it was reported that the photoacceleration of development was correlated with duration of lighting.

XII. Walter, J. H. and R. A. Voitle, 1972. Effect of photoperiod during incubation on embryonic and post embryonic development of broilers. Poultry Sci. 51: 1122–1126.

XIII. Walter, J. H. and R. A. Voitle, 1973. Effect of photoperiod during incubation on embryonic and post embryonic development of quail and chickens. Br. Poultry Sci. 14: 533–540.

Gold and Kalb reported in 1976 that the "light" utilized in conjunction with incubation served only to heat the embryo, thereby increasing the temperature and decreasing the incubation period. See the following publication in this regard:

XIV. Gold, P. S. and J. Kalb, 1976. Secondry heating of chicken eggs exposed to light during incubation. Poultry Sci. 55: 34–39.

In 1975, Coleman and McDaniel reported that a light source constituted as two, 20-watt fluorescent tubes positioned over each egg tray during incubation produced a 15% heavier hatched chick in an 18 day incubation period. The birds appeared to be normal and seemed to be less susceptible to disease than their counterparts incubated in darkness. Light incubation appeared to decrease early embryonic mortality in chicks from poor quality eggs. The latter was considered to be an important observation, since as laying birds age, the size of their eggs increase, while the shell quality of those eggs deteriorates. See the following publication in this regard:

XV Coleman, M. A. and C. R. McDaniel, 1975. The Effect of Light and Specific Gravity on Embryo weight and Embryonic Mortality Poult. Sci. 54: 1415–1421.

SUMMARY OF THE INVENTION

The present invention is addressed to a method and apparatus for improving the production of fowl wherein increased hatchability or yields are obtained within the incubation environment. The invention further provides a capability for expanding the utility of hen egg production by improving chick growth physiology to an extent wherein smaller sized eggs are made more useful for incubation, the chicks therefrom reaching proper size and maturity during subsequent field growth. Further, a method is provided for improving the production of fowl through the use of a technique wherein the avian eggs are placed on a tray in an incubator having a conventionally controlled humidity and temperature environment. The eggs are positioned in a manner wherein the air cell of each is substantially upwardly disposed. As a consequence of this orientation, during its interval of buoyancy, the embryo will be positioned above the yolk and beneath the air cell. The eggs then are exposed during incubation to radiation of select spectral distribution as well as controlled intensity and this exposure takes place substantially over the period of buoyancy of the embryo. The radiation specifically is directed through the air cell and, as a consequence, deleterious effects otherwise occasioned, for example because of internal heating of the egg, are avoided. By exposing the eggs to such radiation during the period of such buoyancy, an interval of about 9 days, increased hatchability or yield is realized.

As another object of the invention, avian eggs are incubated under photoacceleration procedures as above described with light sources preferably having substantial components in the blue or yellow regions as well as in the red region. Preferably, radiation intensities in the green and pink regions as defined herein are minimized. Of the light sources currently available, fluorescent lamps marketed as cool white and white are found to achieve adequate results.

Other objects of the invention will, in part, be obvious and will, in part, appear hereinafter.

The invention, accordingly, comprises the method and apparatus possessing the construction, combination of elements, arrangement of parts and steps which are exemplified by the following detailed disclosure. For a fuller understanding of the nature and objects of the invention, reference should be had to the following detailed description taken in connection with the accompanying drawings.

BRIEF DESCRIPTION OF THE DRAWINGS

FIG. 1 is a schematic representation of a chicken egg showing the position of yolk, embryo and air cell;

FIG. 2 is a family of curves describing the relative radiant power output from fluorescent lamps of equal wattage currently available in the marketplace;

FIGS. 3A-3C are graphs showing the radiant power output in microwatts with respect to wavelength for commercially available fluorescent lamps identified respectively as cool white, daylight and white;

FIG. 4 is a chart showing percent cummulative hatch for chicken eggs versus incubation time for various treatments or lack of treatments thereof;

DETAILED DESCRIPTION OF THE INVENTION

Figure 5:
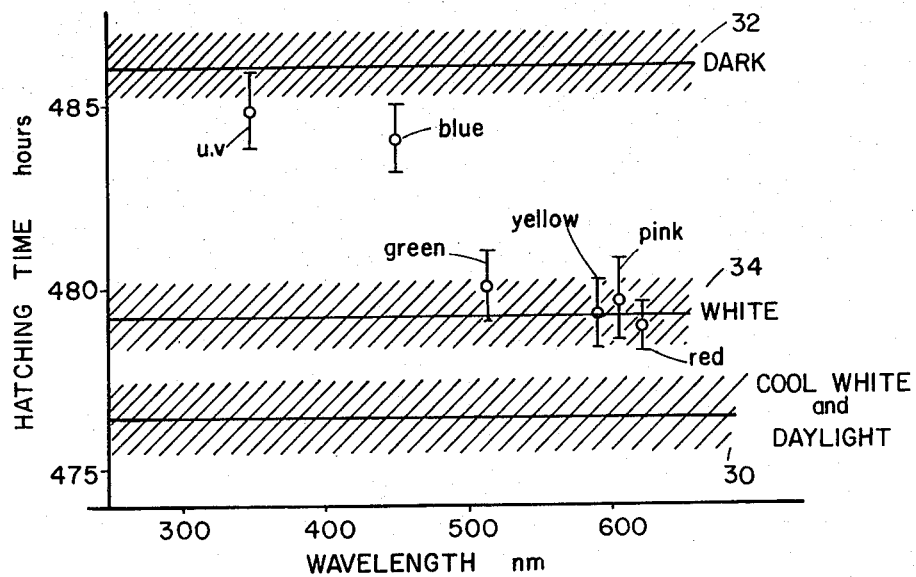
FIG. 5 is a chart relating hatching time with wavelengths utilized in light treatments during incubation as well as showing a no light (dark) control.

Eggs are produced in a commercial environment either for use as a commestible or for the specific purpose of hatching to produce poultry. In present commercial practice where eggs are intended for hatching, the smaller eggs from the hen may be disposed of and those of sufficient weight are stacked in trays which, in turn, are inserted within boxes or wheeled carts and are taken to an installation specifically designed for carrying out incubation and hatching. The chicks which are hatched are placed on farms and grown under controlled feeding conditions for 49-51 days, whereupon the resultant chickens are available as a market item.

Economic considerations are involved at each step in the procedure from the point of egg collection to the point of sale as a food product. For example, a typical hen within its reproductive life will produce a limited number of eggs which are of the earlier noted requisite size. The reason for not utilizing smaller eggs resides in the fact that the chicks which hatch therefrom generally exhibit an average weight of about 38 grams, as opposed to an average weight of about 48 grams for chicks from larger eggs. Where the smaller eggs are incubated and hatched according to current procedures, the smaller chicks which result will remain small throughout their life in the field environment. For such chicks to reach the optimum chicken size suited for marketability, added feeding time and expense would be involved. Accordingly, eggs of proper size are delivered to the commercial hatching facility promptly and under refrigeration and are placed within incubators which typically are maintained at controlled high humidities and relatively high temperatures for the conventional period required to induce hatching. At 18-19 days of incubation the eggs are moved from incubators and placed in hatchers which have compartments quite similar to the incubators but the trays or flats of the incubators are substituted with baskets for retaining the newly hatched chicks. Following hatching, the resultant chicks are avilable for placement on farms.

The value to the poultry industry of economies which may be developed in the course of reproduction of chickens becomes evident when it is considered that many hatcheries will handle 500,000 chicks per week. In this vein, it will be apparent that, should economies resulting from improved hatching yields, shortened periods for feeding and more efficient use of all sizes of eggs be available, relatively substantial amounts of money will be involved.

The instant invention involves a variety of discoveries, all related to improving the yield or hatchability, improved utilization of eggs and control over the interval of incubation. All, however, are directly concerned with the application of radiant energy, mostly from the visible spectrum, in connection with the incubation procedures utilized in commerce. Discrete regions of the visible spectrum will be seen to evoke unique effects in connection with the incubation of eggs.

As part of the discoveries herein, it has been determined that the physiology of the egg must be taken into account as well as the recognition that all eggs have essentially the same genetic potential for developing into fowl of a given size. Through the select utilization of certain portions and intensities of the visible spectrum, this genetic potential can be exploited to an extent wherein chicks hatched from marginally small eggs may be grown to at least the minimum acceptable sizes required for the industry within the conventional 49-51 days feeding period.

An understanding of the physiology of a fowl egg, particularly during the first nine days of its incubation is important to an evaluation of certain of the criteria involved in connection with the discoveries of the instant invention. Looking to FIG. 1, an egg is schematically portrayed in general at 10 and this egg is shown to have a somewhat narrow end in the vicinity represented at 12 as well as an oppositely disposed broadened end portion in the vicinity shown at 14. The yolk of the egg is represented at 16 within the shell and an embryo is represented atop the yolk at 18. Note, that the egg contains an air cell adjacent the broadened end at 20. Egg 10 is schematically depicted as it would be represented during the above-noted initial nine day interval of incubation. During this period of time, the embryo 18 is buoyant and, thus, will move toward the uppermost disposed portion 14 of the yoke of the egg depending upon the position in which the egg is set within the incubator. Consequently, for the orientation of embryo 18 in FIG. 1, egg 10 will have been set within an incubator tray such that the narrow or pointed portion 12 is downwardly disposed. The broad portion 14 is disposed upwardly. Note additionally, that the embryo 18 for such an arrangement is positioned beneath air cell 20 and this is important to this invention. Improved results are achieved when this orientation is utilized during this period of embryo buoyancy. Further, it has been found important that the light utilized in photoaccelerating the incubation state pass downward through the air cell 20 as schematically represented by arrows 21. At the termination of about the aforesaid ninth day of incubation, a physiological change occurs wherein embryo 18 tends to sink into the yolk 16. Inasmuch as yolk 16 is considerably opaque to light, the effects of light upon embryo 18 as compared with its period of buoyancy are changed considerably. By exposing the egg 10 to light from the direction shown by arrows 21, that exposure takes place through the air cell 20 and, as a consequence, physiological photoacceleration has been achieved without detriment. In the latter regard, it has been observed that damaging temperature elevations are developed when the eggs are exposed to radiation which is not directed through the aircell. This is particularly true with respect to light within the pink region.

In the discussion to follow, light sources which are currently available in the marketplace and are of the fluorescent variety are discussed with respect to their spectral power curves. These lights were utilized in carrying out experiments subsequently discussed and summarized both in tabular and graphic form.

Looking to FIG. 2, spectral power curves for fluorescent lamps marketed by General Electric Company, Schenectady, N.Y., under the designations ultra violet, blue, green, gold (yellow), pink and red are shown, the lamps all being of equal radiant energy. FIGS. 3A–3C show charts of the outputs of flourescent tubes by the same manufacturers, respectively, for the marketing designations cool white, daylight and white, the curves relating radiant power in microwatts per 10 nanometers per lumen as plotted against wavelength in nanometers. These lamps also have a radiant power output which is equivalent to the color designated lamps shown in FIG. 2. Here again, such an arrangement improves an evaluation of the effects of the lamps with respect to relative radiant energies. The above lamps are given the following model designations by their manufacturer: F20CW for cool white; F20W for white; F20G for green; F20GO for yellow or gold; F20PK for pink; F20R for red; F20BLB for UV or purple; F20B for blue; and F20D for daylight.

One principal investigation of the use of photoaccelerating incubation techniques according to the invention is summarized in Tables I and IA which should be read together. In this investigation, four Robbins "Hatch-O-Matic" incubators were equipped with 20-watt lights of the varieties described in connection with FIGS. 2 and 3A–3C, two such 20-watt variety of lights were positioned above the tray positions within the incubators. To carry this out, a tray was removed and replaced with a box containing the fluorescent lamps. A control was provided wherein two lamps were positioned in identical manner but not turned on to provide a dark or "no light" incubation. The light boxes or lamp-containing boxes were positioned at threedistances from the eggs in order to derive an intensity difference as well as the above dark control, the intensity labeled "1" representing a higher intensity wherein the lamps were positioned 12 centimeters from the eggs, the intensity labeled "2" representing a lower intensity in which the lamps were positioned 32 centimeters from the eggs and a third group in the dark was incubated with the boxes 52 centimeters above the eggs to determine the effect of the boxes.

TABLE I

| Treatment Light Type | Intensity | # Eggs Set | # Eggs Hatched | Egg Size 1 Hatch Time Hrs. | Weight | Egg Size 2 Hatch Time Hrs. | Weight |
|---|---|---|---|---|---|---|---|
| Pink | 1 | 90 | 42 | 483.7 ± .7 | 49.5 ± 1.8 | 483.6 ± 2.4 | 46.7 ± .9 |
|  | 2 | 90 | 77 | 480.2 ± 1.2 | 50.2 ± 1.2 | 478.4 ± | 50.3 ± .6 |
| Red | 1 | 90 | 65 | 481.2 ± 2.6 | 51.3 ± 1.0 | 479.0 ± 3.0 | 47.8 ± 1.1 |
|  | 2 | 90 | 68 | 486.3 ± 3.9 | 49.2 ± .9 | 475.5 ± 1.2 | 50.3 ± .6 |
| Yellow | 1 | 90 | 73 | 482.3 ± 3.2 | 50.0 ± 1.1 | 477.7 ± 3.1 | 50.0 ± .8 |
|  | 2 | 90 | 68 | 486.0 ± 1.9 | 51.0 ± .8 | 485.5 ± 3.2 | 48.0 ± .5 |
| Green | 1 | 90 | 47 | 480.6 ± 4.4 | 49.4 ± .6 | 477.5 ± 1.0 | 46.1 ± 2.0 |
|  | 2 | 90 | 64 | 486.7 ± 4.8 | 51.1 ± .8 | 483.2 ± 2.3 | 50.4 ± .4 |
| Blue | 1 | 90 | 73 | 486.8 ± 2.8 | 51.2 ± 1.8 | 486.4 ± 3.2 | 48.5 ± .9 |
|  | 2 | 90 | 73 | 480.8 ± 3.7 | 51.1 ± 1.4 | 484.5 ± 1.6 | 48.4 ± 1.1 |
| UV | 1 | 90 | 69 | 489.0 ± 3.2 | 50.5 ± 3.2 | 487.0 ± 1.8 | 48.8 ± .9 |
|  | 2 | 90 | 71 | 481.9 ± 2.4 | 51.9 ± .8 | 482.6 ± 1.4 | 49.9 ± .7 |
| Cool White | 1 | 90 | 61 | 474.2 ± .8 | 52.2 ± 1.0 | 479.8 ± 2.0 | 48.8 ± 1.0 |
|  | 2 | 90 | 63 | 483.3 ± 1.4 | 52.4 ± 1.0 | 480.8 ± 2.1 | 50.2 ± .6 |
| White | 1 | 90 | 69 | 475.6 ± 3.2 | 51.4 ± 1.2 | 475.4 ± 2.7 | 48.8 ± .9 |
|  | 2 | 90 | 66 | 478.7 ± 3.2 | 49.7 ± 1.4 | 481.2 ± 2.6 | 49.1 ± .6 |
| Daylight | 1 | 90 | 69 | 473.1 ± 2.0 | 47.4 ± 2.0 | 484.5 ± 2.4 | 47.9 ± 1.1 |
|  | 2 | 90 | 66 | 481.0 ± 2.0 | 50.5 ± .3 | 484.3 ± 1.2 | 49.8 ± .6 |
| No Light | 1 | 90 | 65 | 493.7 ± 2.7 | 50.3 ± .3 | 487.0 ± 1.0 | 49.5 ± 1.0 |
|  | 2 | 90 | 69 | 496.3 ± 2.2 | 50.1 ± .2 | 487.5 ± 1.8 | 49.2 ± .7 |
|  | 3 | 90 | 70 | 494.1 ± 1.8 | 50.1 ± .7 | 488.8 ± 1.1 | 48.7 ± .6 |

TABLE IA

| Treatment Light Type | Intensity | # Eggs Set | # Eggs Hatched | Egg Size 3 Hatch Time Hrs. | Weight | Egg Size 4 Hatch Time Hrs. | Weight | Egg Size 5 Hatch Time Hrs. | Weight |
|---|---|---|---|---|---|---|---|---|---|
| Pink | 1 | 90 | 42 | 480.5 ± 2.0 | 46.7 ± .7 | 476.0 ± 1.4 | 44.8 ± .6 | 477.8 ± 2.9 | 42.4 ± 1.0 |

TABLE IA-continued

| Treatment Light Type | Intensity | # Eggs Set | # Eggs Hatched | Egg Size 3 Hatch Time Hrs. | Egg Size 3 Hatch Weight | Egg Size 4 Hatch Time Hrs. | Egg Size 4 Hatch Weight | Egg Size 5 Hatch Time Hrs. | Egg Size 5 Hatch Weight |
|---|---|---|---|---|---|---|---|---|---|
|  | 2 | 90 | 77 | 481.1 ± 1.8 | 47.3 ± .4 | 479.1 ± .9 | 44.6 ± .4 | 481.7 ± 1.1 | 42.9 ± .7 |
| Red | 1 | 90 | 65 | 480.1 ± 1.2 | 46.6 ± .4 | 477.3 ± 1.0 | 44.5 ± .6 | 477.2 ± 1.4 | 42.4 ± .4 |
|  | 2 | 90 | 68 | 480.2 ± 1.2 | 46.9 ± .4 | 480.5 ± .9 | 44.7 ± .7 | 475.4 ± 1.9 | 42.1 ± .4 |
| Yellow | 1 | 90 | 73 | 480.7 ± 1.7 | 47.3 ± .3 | 478.4 ± 1.6 | 44.5 ± .4 | 473.7 ± .8 | 40.8 ± .7 |
|  | 2 | 90 | 68 | 482.1 ± 1.4 | 47.3 ± .5 | 481.9 ± 1.3 | 45.6 ± .6 | 479.6 ± 1.2 | 43.4 ± .3 |
| Green | 1 | 90 | 47 | 480.9 ± 2.5 | 47.2 ± .6 | 481.0 ± 1.1 | 44.5 ± .5 | 477.0 ± 1.9 | 41.3 ± .6 |
|  | 2 | 90 | 64 | 482.2 ± 1.5 | 46.7 ± .6 | 486.6 ± 2.2 | 44.1 ± .7 | 486.3 ± 4.3 | 40.3 ± .6 |
| Blue | 1 | 90 | 73 | 482.2 ± 1.8 | 46.5 ± .6 | 485.1 ± 1.4 | 43.8 ± .6 | 481.0 ± 1.1 | 42.2 ± .8 |
|  | 2 | 90 | 73 | 487.3 ± 1.3 | 46.8 ± .5 | 484.1 ± 1.6 | 44.9 ± .6 | 480.1 ± 1.3 | 40.0 + 1.1 |
| UV | 1 | 90 | 69 | 482.3 ± 1.8 | 45.8 ± .5 | 486.2 ± 1.8 | 43.8 ± .5 | 481.0 ± 3.2 | 41.6 ± 1.1 |
|  | 2 | 90 | 71 | 479.7 ± 1.8 | 46.2 ± .4 | 485.3 ± 1.5 | 42.4 ± .5 | 480.7 ± 2.6 | 43.6 ± 1.7 |
| Cool White | 1 | 90 | 61 | 479.9 ± 1.9 | 46.2 ± .5 | 478.5 ± 1.6 | 44.5 ± .6 | 482.6 ± 3.1 | 39.3 ± 1.6 |
|  | 2 | 90 | 63 | 479.3 ± 1.6 | 46.3 ± .4 | 478.2 ± 1.5 | 42.7 ± .6 | 478.2 ± 1.6 | 37.7 ± .4 |
| White | 1 | 90 | 69 | 475.9 ± 1.6 | 43.9 ± .5 | 478.2 ± 1.5 | 46.8 ± .4 | 476.3 ± 5.4 | 41.3 ± 1.1 |
|  | 2 | 90 | 66 | 482.2 ± 1.2 | 46.2 ± .6 | 479.9 ± 1.4 | 43.9 ± .8 | 478.5 ± 4.5 | 41.2 ± .7 |
| Daylight | 1 | 90 | 69 | 475.7 ± 1.5 | 46.5 ± .4 | 474.7 ± 1.1 | 43.1 ± .7 | 474.0 ± 3.9 | 40.9 ± 1.5 |
|  | 2 | 90 | 66 | 483.8 ± 1.2 | 45.9 ± .6 | 480.7 ± 1.3 | 44.2 ± .5 | 481.4 ± 3.5 | 39.8 ± 1.4 |
| No Light | 1 | 90 | 65 | 487.5 ± 1.2 | 46.3 ± .4 | 486.0 ± 0 | 45.0 ± .8 | 482.6 ± 1.6 | 42.0 ± .5 |
|  | 2 | 90 | 69 | 485.0 ± 1.5 | 46.3 ± .6 | 485.1 ± 1.2 | 43.5 ± .6 | 488.0 ± 7.0 | 42.2 ± .4 |
|  | 3 | 90 | 70 | 489.9 ± 1.2 | 46.5 ± .4 | 490.2 ± .9 | 42.2 ± 1.1 | 487.3 ± 1.7 | 41.9 ± .5 |

Note in Tables I and IA that the nine fluorescent lamps as above identified are labeled at the left along with a "no light" categorization. Adjacent to the lamp identification column is an intensity designation. Thus, ten different treatments of radiation and no radiation were provided, the nine light treatments being provided at two intensities. Treatment groups were designated for these intensities, light types and control in correspondence with five egg sizes which are numerically designated 1–5 in the Tables along the top thereof. Egg size 1 represented a jumbo size having a weight of more than 28 ounces per dozen; egg size 2 represented extra large eggs having a weight of 26–28 ounces per dozen; egg size 3 represented large eggs having a weight of 24–26 ounces per dozen; egg size 4 represented medium eggs having a weight of 22–24 ounces per dozen; and egg size 5 represented small eggs having a weight of 20–22 ounces per dozen. Ninety broiler eggs were provided for each treatment grouping. Equal numbers of each egg size were present in each group. The eggs were positioned within the incubators in a vertical orientation with the broad end having the air cell was positioned uppermost and those eggs exposed to the indicated radiation were exposed through the air cell in the manner described in connection with FIG. 1. The eggs were incubated at standard humidity and temperatures (99.7° F.–99.9° F., wet bulb 87° F.) and following 18 days of incubation were removed and placed in a hatcher. The eggs and lights were rotated between opposite 45° orientation with respect to horizontal during incubation. During hatching, a temperature value was maintained within the range of 98.5–99.0° F. and the wet bulb was 92° F. The temperature controls of the incubator were adjusted to maintain the above necessary temperature ranges in accommodation of the thermal inputs represented by the lights. Only one hatcher was utilized because of the cost involved in separate hatchers. This being the case, it was known that substantially all of the incubated eggs which would hatch would do so within a 48-hour period of time. This coordinated hatching has been reported upon by Vince. See, for example, the following publication:

XVI. Vince, M. A., 1966. Artificial Acceleration of Hatching in Quail Embryos. Animal Behavior 14: 389–394.

Appropriate marking by color coding and stripes was provided for each egg showing the type of incubation treatment it received including light intensities. In the hatcher, the eggs were positioned within baskets with dividers so that a hatched chick would be identified with the shell it hatched from and, in turn, the type of treatment it received during incubation. From the eighteenth through the twenty-second day of incubation, the eggs were examined each two hours and the chicks which hatched were weighed and the eggs from which they hatched were examined to determine the egg size and type of treatment. Additionally, the numbers of hours elapsed for incubation to hatching were recorded. These data are set forth in Tables I and IA, the incubation time to hatching being represented in hours and the weight of the hatched chicks for each of the egg sizes 1–5 being set forth in grams. Thus, the weight ±s.e. (standard error) in grams represents the weight of the chicks within two hours of hatching and the time ±s.e. is in hours from the initial placement of the eggs in the incubators. The Tables also reveal the number of eggs hatched for each of the treatments provided as well as the control (no light).

Interpretation of the data of Tables I and IA may be provided through a series of charts as set forth in FIGS. 4–8. In the interest of providing more meaningful comparisons, in addition to wavelength related data recorded along the abcisses of the charts, no light controls (dark) and broader spectrum illumination results (White, Cool White, Daylight) also are superimposed on the charts. Looking to FIG. 4, the percent cumulative hatch evolved is represented in very general fashion. Curve 22 of the figure is a representative one showing the typical cumulative hatch development for eggs which are incubated in darkness and which would not be commingled with photoaccelerated eggs in a hatcher. Note, that the average completion time for conventionally incubated eggs is 519 hours. Because of the coordinated hatching phenomena reported by Vince (supra) the control eggs incubated jointly with light treated eggs, hatch earlier as represented by curve 24. The cumulative hatch characteristic for those eggs for all intensities hatched under photoacceleration by cool white, white and daylight lamps is represented by curve 26, while the corresponding curve representing the cumulative hatch characteristic for all eggs under the remaining lights for all intensities is represented at curve 28. These curves generally show that subjecting the eggs to a wide range of light intensities during incubation will have an accelerating effect upon hatching.

Turning to FIG. 5, the hatching times for those eggs subjected to the higher intensity light treatment as well as no light (dark) are compiled. The hatched portions of this figure and the figure to follow represent standard error ranges. Note, that the average hatching time for eggs subjected to cool white and daylight as shown at region 30 was about 476 hours. Correspondingly, the eggs maintained under no light, as represented at region 32, required about 486 hours for hatching and the hatching also was influenced (coordinated hatching) by the necessity of maintaining them with the photoaccelerated eggs in the hatchery. Hatching times for the narrow bandwidth lights also are represented in the figure. Note, that u.v. and blue designated lights represent hatching times not significantly different from the control at 32. The remaining narrow bandwidth lights, i.e. green, yellow, pink and red are somewhat closely associated in hatching time characteristic with the white lamp as represented at region 34. Of the short bandwidth lamps, the red and yellow lamps produce the fastest hatching times and those hatching times were most significant in larger sized eggs; of these, the jumbo eggs (1) being accelerated the most with respect to the control. Generally, smaller sized eggs will hatch earlier than larger ones, consequently, the photoacceleration technique will have a most significant effect upon larger sized eggs with respect to time of hatch.

Figure 6:
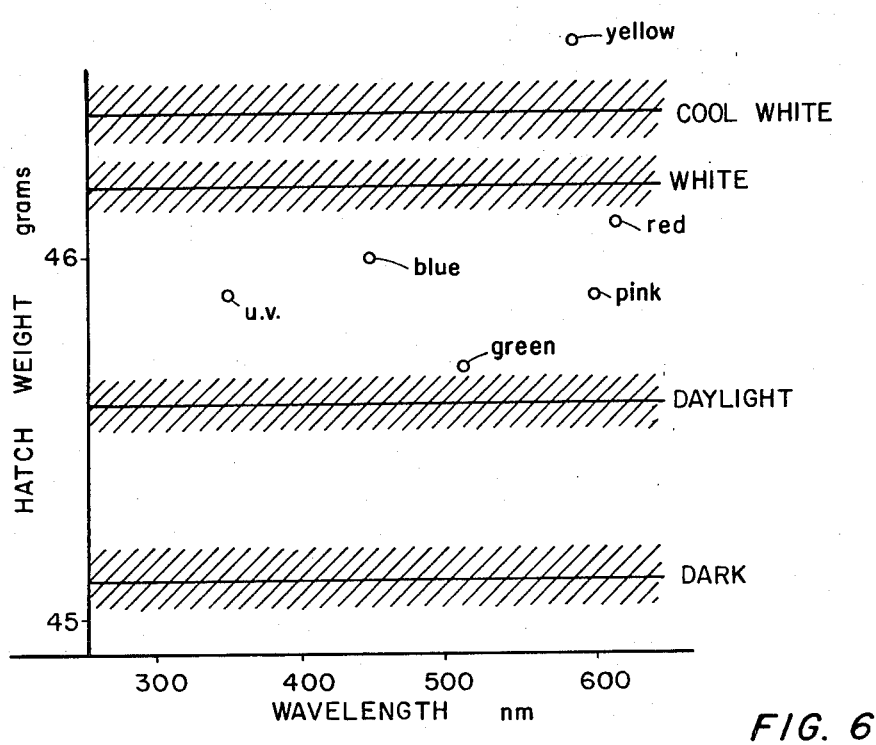
FIG. 6 is a chart relating hatch weight with wavelength during incubation and showing a no light (dark) treatment.

Looking to FIG. 6, the average hatch weights in grams are shown for the no light control and remaining lights, the figure shows that illumination of the eggs can develop greater hatch weights and, as revealed in Tables I and IA, this holds true particularly for smaller eggs. It is this greater percentage increase in the weight of chicks hatched from smaller eggs which permits a more efficient utilization of the egg output of a given hen. Under typical conditions, wherein all eggs are maintained in darkness, hatching will occur about 24 hours later than the no light control shown in Tables I and IA. This means that the chicks from eggs held only within dark incubators and hatchers will be smaller inasmuch as more of the yolk energy of the eggs is used for maintenance of the chicks for that additional 24 hour period. On the other hand, where the excess yolk is taken into the abdomens of the chicks, they hatch having a larger weight as is the case for chicks incubated under selective illumination.

In FIGS. 5 and 6, the mean standard error takes account of the number of observations made to establish the hatch weight correlation as well as hatching time correlation with wavelength. With respect to FIG. 6, the standard error was approximately ±0.4 grams for the hatch weight of the narrow bandwidth lights. Further, it may be observed that the egg size component of the treatment has the most effect upon hatch weight.

Figure 7:
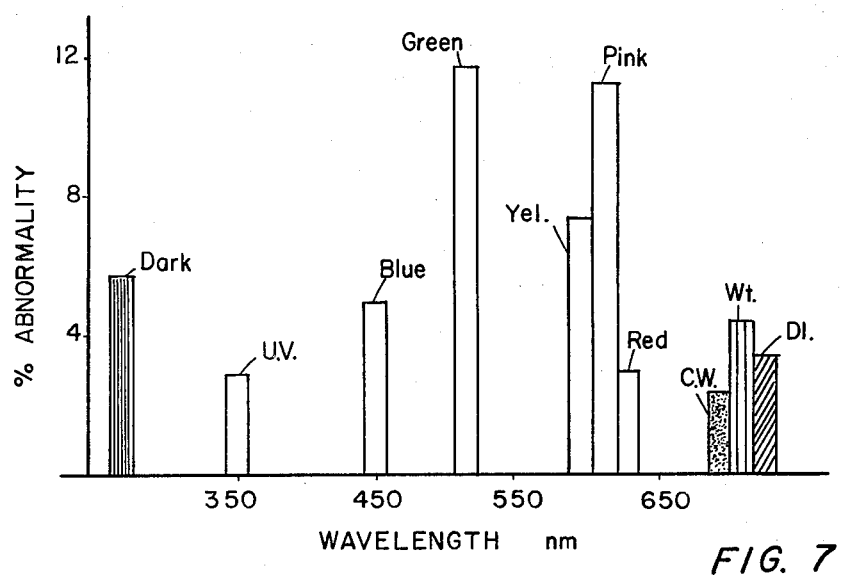
FIG. 7 is a chart relating percent abnormal chicks with the wavelengths utilized in photoacceleration of the incubation thereof.

Now turning to FIG. 7, the percentage of those chicks deemed to be abnormal and, thus, unusable, are plotted in bar chart fashion with respect to the narrow bandwidth lamps. Bars not associated with the wavelength data but representing white, cool white, daylight and the dark control also are positioned in the chart for purposes of comparison. The chart was developed utilizing the average figures for a combined high and low light intensity setting. It may be noted from the figure, that the green lamp developed a somewhat extraordinary percentage of abnormalities. Additionally, the type abnormality occurring within green lamp illumination was somewhat consistent as being an ectopic viscera. Abnormalities in the green region were particularly severe for the high intensity light settings as opposed to the low intensities. FIG. 7 also reveals that the pink region lamp developed an unusually high level of abnormalities, those abnormalities including ectopic viscera, microencephalia and micropthalamia. It was observed that the pink lamps had a tendency to increase the temperature inside the egg and it is believed that this temperature increase contributed to the development of the abnormalities. Note also from the figure, that the percentage of abnormalities developed from the red lamp region appear to be below that of the control, while the yellow region lamp appeared to develop abnormalities greater than the control. Abnormalities developed from exposure to u.v., blue, cool white, white and daylight appear lower than the control.

Figure 8:
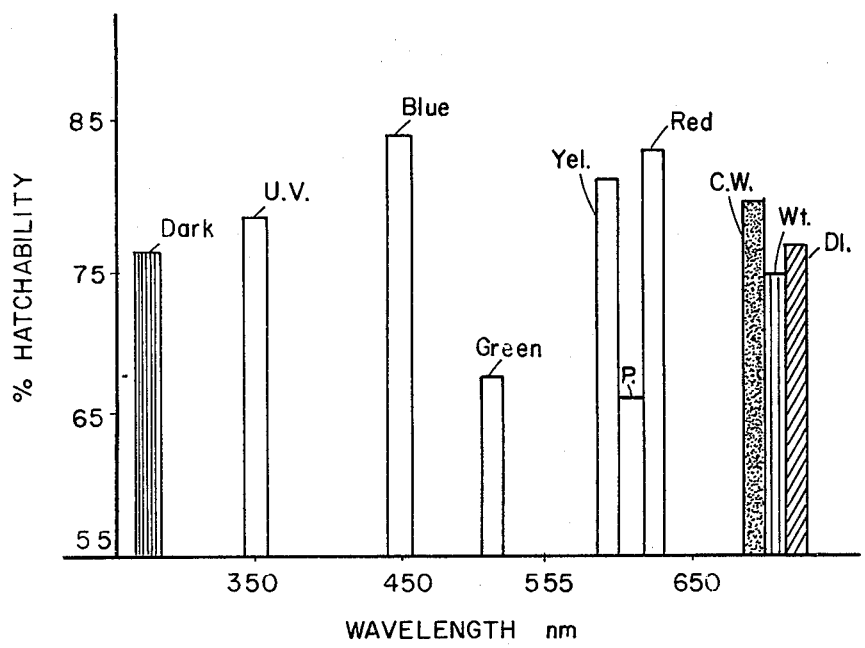
FIG. 8 is a chart relating percent hatchability or yield with the wavelength utilized in photoaccelerating chicken eggs during incubation.

Turning to FIG. 8, the percent hatchability as related to the type of illumination utilized, including no light or dark, and the cool white, white and daylight lamps is revealed. It is this form of data from which an indication of improved incubation production efficiency may be recognized. In effect, the percent hatchability represents the yield of the incubation process. The figure reveals that illumination with green region lamps results in poor yields, particularly at higher intensities of those regions. This lower hatchability is due at least in part to the abnormality in the chicks which are developed as described in connection with FIG. 7. However, it may be noted that illumination in the blue, yellow and red regions appears to improve hatchability over the control. Additionally, improvement will be seen with utilization of cool white lamps. The figure reveals that about a 6% improvement in yield is available through appropriate selection of light spectra and intensity and, assuming that the incubating organization is paying the current 16¢ per chick and is processing 500,000 chicks per week, the savings due to improved hatchability or yield is significant.

However, as indicated earlier, economies also are realized with the process and system of the invention in consequence of making smaller eggs avialable to the incubation process. For example, the chicks hatched from small sizes eggs (5) have the same genetic potential for growth as chicks hatched from larger eggs. Through the instant photoacceleration process, these small size eggs are usable within the incubation process, inasmuch as, at the end of a typical field growth of the chicks, their size is equivalent for commercial use purposes to the size of chicks grown from the larger eggs.

Turning to Table II, post hatch weights of chicks incubated in typical darkness and incubated under light conditions through their eight week feeding period is provided.

TABLE II

| Egg Size | 5 | | 4 | | 3 | | 2 | |
|---|---|---|---|---|---|---|---|---|
| | | | | LIGHT | | | | |
| Sex | M | F | M | F | M | F | M | F |

TABLE II-continued

| Number | 52 | 73 | 68 | 72 | 16 | 15 | 6 | 5 |
|---|---|---|---|---|---|---|---|---|
| Weight (gms.) | | | | | | | | |
| 1 Week | 101 | 98 | 109 | 106 | 108 | 108 | 118 | 105 |
| 2 Weeks | 209 | 196 | 220 | 206 | 215 | 214 | 215 | 200 |
| 4 Weeks | 636 | 550 | 637 | 575 | 622 | 586 | 661 | 551 |
| 6 Weeks | 1179 | 1006 | 1187 | 1050 | 1170 | 1040 | 1227 | 1001 |
| 8 Weeks | 1883 | 1546 | 1866 | 1595 | 1839 | 1584 | 1933 | 1587 |

DARK

| Egg Size | 5 | | 4 | | 3 | | 2 | |
|---|---|---|---|---|---|---|---|---|
| Sex | M | F | M | F | M | F | M | F |
| Number | 81 | 77 | 86 | 79 | 19 | 19 | 4 | 4 |
| Weight (gms.) | | | | | | | | |
| 1 Week | 84 | 85 | 88 | 88 | 97 | 94 | 99 | 94 |
| 2 Weeks | 186 | 174 | 193 | 185 | 203 | 202 | 188 | 196 |
| 4 Weeks | 557 | 523 | 586 | 536 | 584 | 534 | 649 | 567 |
| 6 Weeks | 1105 | 980 | 1119 | 995 | 1139 | 1000 | 1162 | 1062 |
| 8 Weeks | 1808 | 1538 | 1843 | 1567 | 1861 | 1545 | 1743 | 1451 |

Note in the table that egg sizes 2–5 were provided. The sex of the chicks is noted as M for male and F for female and the numbers of chicks evaluated over the eight week interval are noted as labeled. Observation of the weight levels for the chickens, for example, at a six week period shows that chicks hatched under light from small eggs are heavier than the corresponding chicks hatched from eggs not subject to illumination throughout the period of their incubation. With the availability of these small sized eggs for incubation procedures, a hen which otherwise would lay 110 settable eggs during her reproductive life would increase that to a potential 115 to 120 settable eggs. At present, only eggs having a weight of 22 ounces per dozen or more are selected for setting within the incubators.

Concerning the extent of illumination during incubation, to achieve improvements in hatchability as shown in FIG. 8, it is necessary that the illumination commence the first day of incubation. The period of illumination treatment required for improving hatchability should extend to about the third day of incubation. Providing illumination to decrease hatching time will depend upon the requirements of the operator. However, where a time decrease is desired, the illumination treatment should take place between the first and ninth day of incubation. The effect of illumination intended for decreased hatching time is found to be additive in nature, thus if desired, it may be applied intermittently during the treatment. The improvement in chick weight stemming from incubation imposed lighting results from illumination commencing at about the ninth day of incubation. The light need not be continuous, i.e. it may be imposed intermittently. However, whether continuous or intermittent, the treatment must extend throughout about the ninth through about the seventeenth day of incubation. Various hypotheses can be advanced for this reaction characteristic, the termination of photoacceleration at about day 9 perhaps being related to the stage of development of the extraembryonic membranes. The allantois, in particular, goes through an extremely rapid increase in development at about day 9. Each membrane absorbs a certain amount of light as the light travels to the embryo. Since the mass of membranes increases rapidly near the end of acceleration, there is not enough light energy to break the threshold of energy required for further acceleration. In effect, as the embryo moves to the yolk, the transmissibility of light with respect to the embryo decreases somewhat.

A review of the data set forth hereinabove reveals several aspects of the invention. Depending upon the type of illumination utilized, i.e. the particular spectrum, it may be possible to alter the direction of illumination following the ninth day of incubation to positions other than those directed through the air cell. This would not be the case for those spectra, i.e. pink, which have a tendency to raise the temperature of the internal portion of the egg. Red and yellow region lamps appeared to accelerate differentation the most for all such colored lights. Daylight and cool white lamps were more reactive than the colored grouping of lamps and jumbo eggs were seen to be accelerated more by light during incubation. This is advantageous, inasmuch as, generally, jumbo eggs are the slowest hatching and, therefore, a greater potential for improvement is available with respect to them in the instant regard. Yellow lights were seen to have produced larger chicks overall, the greatest increase in weights being in the smaller egg size chicks. Blue light, on the other hand, produced better hatchability. Additionally, the blue light appeared to decrease early mortality in the chicks more significantly than any other lights. With the exception of the u.v. lamp, the relative energy levels of these lamps was measured at the position of the eggs within each incubator. To carry this out a Hilger and Watts thermopile, model No. FT17 was utilized. This thermopile is one of a compensated variety having both shielded and unshielded junctions such that the thermally generated energy at the egg level is compensated for in carrying out a measurement. The relative energy levels are listed below in Table III with respect to the identified lamps. These measurements are considered to be accurate within a range of ± about 0.15%.

TABLE III

| Light Type | Intensity | Relative Intensities |
|---|---|---|
| Cool White | 1 | 25.8 |
| | 2 | 22.0 |
| White | 1 | 23.5 |
| | 2 | 21.1 |
| Green | 1 | 44.3 |
| | 2 | 25.9 |
| Yellow | 1 | 17.0 |
| | 2 | 14.5 |
| Pink | 1 | 15.0 |
| | 2 | 11.0 |
| Red | 1 | 6.8 |
| | 2 | 6.6 |
| Blue | 1 | 10.7 |
| | 2 | 10.0 |
| Daylight | 1 | 19.2 |

TABLE III-continued

| Light Type | Intensity | Relative Intensities |
| --- | --- | --- |
| | 2 | 17.5 |

Conversion of the relative value data to energy may be provided by dividing the relative values by 16, the resultant values being in microwatts per $cm^2$ sec. Recalling that the higher intensities are identified by the numeral 1, it may be observed from Tables I and IA that the low hatchability or yield in the green region is associated with a relatively high intensity measurement. This also holds in connection with the pink designated lamp. In connection with the latter, recall that it was determined that the internal temperature of the eggs was elevated in consequence of illumination in the pink region.

Figure 9:
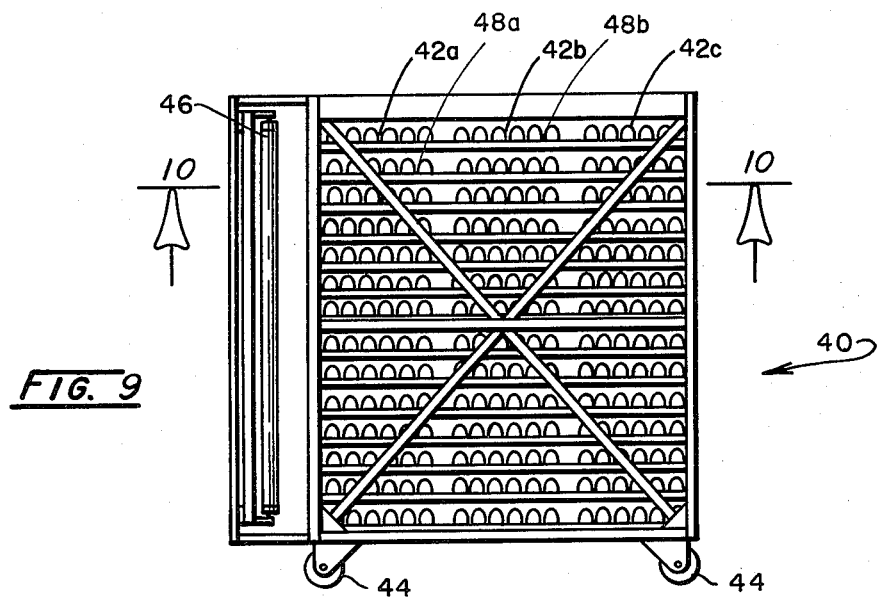
FIG. 9 is a schematic representation of a commercial incubator rack and flat arrangement.
Figure 10:
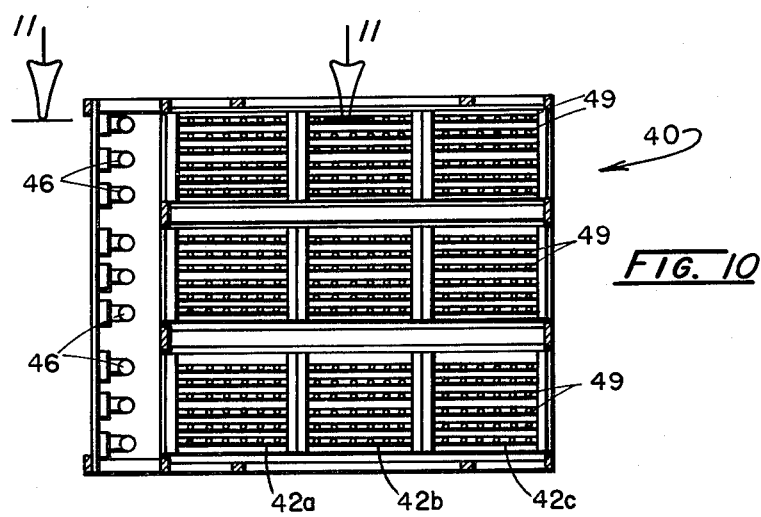
FIG. 10 is a bottom sectional view showing a tray and lighting arrangement utilized in applying the instant invention to commercial practice taken through the plane 10—10 of FIG. 9.
Figure 11:
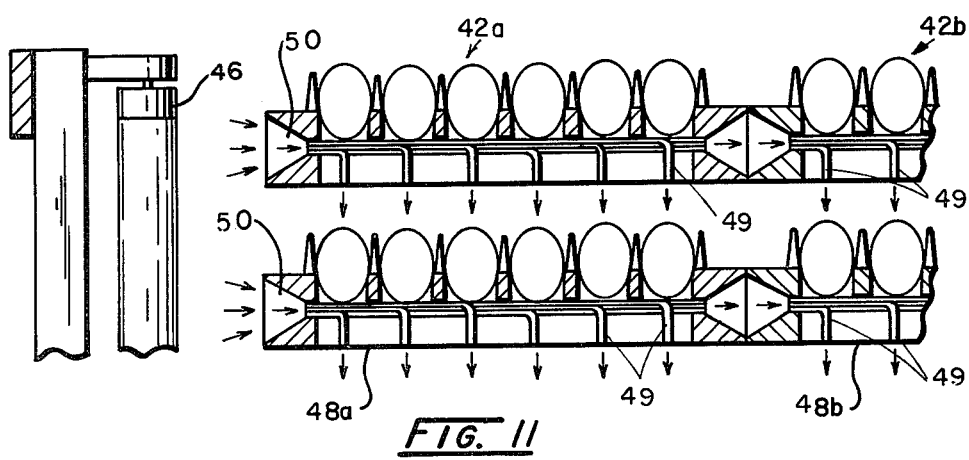
FIG. 11 is a partial sectional view taken through the plane 11—11 of FIG. 10.

FIGS. 9, 10 and 11 illustrate an implementation of the process of the invention to hatchery equipment with certain components shown in exaggerated scale. FIG. 9 shows a rack or support structure 40 which carries a plurality of flats or trays, one, outermost upperrow thereof being shown at 42a–42c. When filled with eggs, the rack 40 is moved by coasters 44 into an incubator where it remains for the designated incubation interval. The trays are periodically pivoted through an arc extending above and below horizontal by a 45° amount. To provide light input into the rack, fluorescent lamps as are shown at 46 are mounted at one side of the rack.

Looking to FIG. 11, the technique by which light is conducted to the uppermost portion of each egg is revealed. Here uppermost trays 42a and 42b are shown above a second and next adjacent lower level of trays 48a–48b within rack 40. All trays are shown having fiber optic bundles 49 extending from a light gathering manifold portion 50 (exaggerated) to a downwardly directed orientation terminating directly over a next adjacent lower tray. Thus, light entering the manifold or collector region 50 of tray 42a is directed by discrete fiber optic bundles 49 to the top of the eggs within tray 48a. Similarly, the light gathered within the collector region 50 of tray 48a is directed to a unique egg within a next adjacent lower tray.

FIG. 10 shows a bottom view of the trays, the output ends of the fiber optic bundles being revealed having a geometry suited for alignment with lower disposed eggs. Light also is piped by the fiber optics from one tray to the next for a given level or row thereof. For example, looking additionally to FIG. 11, light entering collector region 50 of tray 42a is extended to the corresponding collector region 50 of tray 42b and so forth. Because the light source represented by lamps 46 extends along the locus of movement of the trays, no diminution of light is occasioned by the necessary movement. The trays which are utilized for carrying the eggs conventionally are molded of plastic, and the light transmitting arrangement can be molded integrally therewith. Auxiliary light piping, for example, an empty tray is necessary for directing light to the uppermost position trays 42a–42c.

A broad arrangement of techniques for applying the teachings of the invention will occur to those having ordinary skill in the art. Accordingly, since certain changes may be made in the above method and apparatus without departing from the scope of the invention herein involved, it is intended that all matter contained in the above description or shown in the accompanying drawings shall be interpreted as illustrative and not in a limiting sense.

I claim:

1. The method for improving the hatchability, feed efficiency and grow-out of fowl comprising the steps of:
   positioning fowl eggs in an incubator having a controlled humidity and temperature environment, said eggs being positioned with the air cell upwardly disposed; and
   exposing each said egg at the shell portion adjacent said air cell thereof to radiation selected from the group of regions of the visible spectrum consisting of the yellow region, the red region, the blue region and combinations thereof, said exposure being substantially over the period of buoyancy of the embryo, said radiation having an intensity at each said egg of a level wherein the internal temperature of said egg is not substantially affected thereby.

2. The method for improving the production of fowl of claim 1 wherein said eggs are exposed to said radiation substantially throughout the period of incubation thereof.

3. The method for improving the hatchability, feed efficiency and grow-out of avian eggs comprising the steps of
   positioning said eggs within an incubator having a controlled humidity and temperature in a manner wherein the air cell of each said egg is upwardly disposed; and
   exposing each said egg at the shell portion adjacent the said air cell to radiation selected from the group of regions of the visible spectrum consisting of the yellow and the red region and the blue region and combinations thereof, said exposure being substantially over the period of buoyancy of the embryo.

4. The method of claim 3 in which said radiation exposure is continuous and is commenced at least within the first three days of incubation of said eggs.

5. In an incubator for carrying out the incubation of fowl eggs where a support structure is provided for receiving trays in substantially vertically stacked and mutually aligned form, each said tray having a plurality of cavities for positioning said eggs in an orientation wherein the air cell of each thereof is uppermost, the improvement comprising:
   means for mounting a source of radiation adjacent said support structure, said source having select spectral distribution and intensity;
   a said tray including means to support eggs and means to receive, transmit and discharge radiation from said source, said discharging means discharging light in a pattern to encounter the upper surface of each egg which could be supported below said tray by an identical and vertically aligned tray;
   with said tray in operative position, the means to receive light being near the sides of the tray and the means to discharge light discharging a portion downward.

6. A tray for the incubation of eggs comprising:
   means to support eggs and means to receive, transmit and discharge light, said discharging means discharging light in a pattern to encounter the upper surface of each egg which could be supported below said tray by an identical and vertically aligned tray;
   with said tray in operative position, the means to receive light being near the sides of the tray and the means to discharge light discharging a portion downward.

7. The tray of claim 6 including means to discharge light downward in a plurality of locations.

8. The tray of claim 6 including means to discharge light horizontally.

* * * * *